Aug. 12, 1941.    G. W. DAVIS ET AL    2,251,905

LAWN MOWER

Filed Aug. 12, 1940

INVENTOR.
George W. Davis and
BY Walter C. Davis,
Hood & Hahn.
ATTORNEYS

Patented Aug. 12, 1941

2,251,905

UNITED STATES PATENT OFFICE 2,251,905

LAWN MOWER

George W. Davis and Walter C. Davis, Richmond, Ind., assignors to G. W. Davis Corporation, Richmond, Ind., a corporation of Indiana Application August 12, 1940, Serial No. 352,188

2 Claims. (Cl. 56—294)

Lawn mowers of the type comprising a rotary cutter having a circumferentially spaced series of helical blades and an adjustable coacting straight blade, have been manufactured in large quantities and, for many years, it has been commonly supposed that best grass cutting results could be obtained when the straight blade was so adjusted that the helical blades would lightly contact the straight blade. In these machines the straight cutter blade has generally been attached to a carrier pivotally mounted on bearings carried by the end plates of the machine to form a pivoted axis for the blade parallel with the axis of the rotary cutter, and generally associated with this carrier have been two adjustable temper screws mounted on each end plate and engaging the carrier at two points, one on each side of the pivotal axis. The temper screws have, of course, been so arranged as to be more or less accessible to the unskilled user who, when adjusting the same, was quite likely to unevenly adjust them in such manner as to warp the carrier and its blade and thereby subject the end plates to such stresses as to cause them to crack.

We have discovered that the useful life of a lawn mower of this type may be prolonged at its peak of cutting efficiency if the stationary blade is at all times without internal stress and its active edge accurately positioned parallel with the axis of the rotary blade and uniformly spaced from the cylinder of travel of the active edges of the helical blades by an amount equal to the thickness of very thin paper.

The object of our invention, therefore, is to provide a mounting for the carrier of the stationary blade that the active edge of its blade may be readily so adjusted without subjecting the blade to warping stresses and the end plate to injurious stresses.

The accompanying drawing illustrates an embodiment of our invention.

Figure 1:
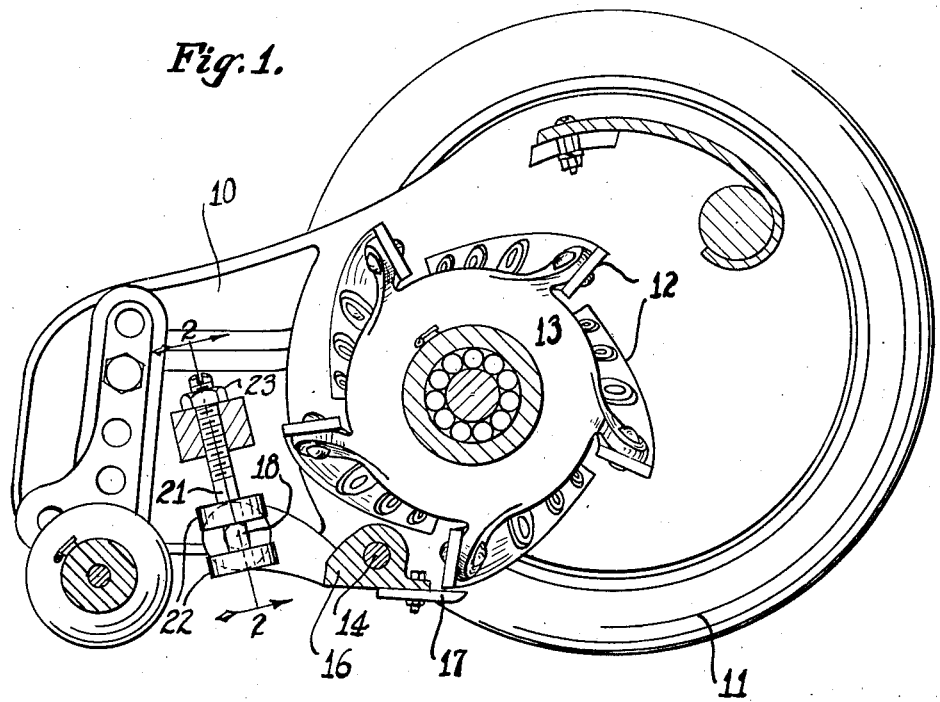
Fig. 1 is a vertical transverse section of a mower embodying our invention.
Figure 2:
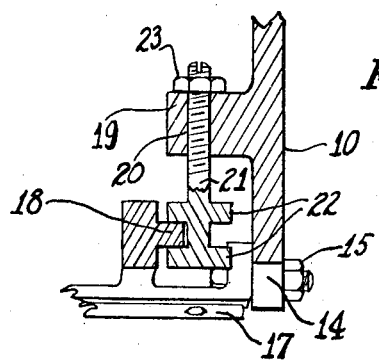
Fig. 2 is a fragmentary section on line 2—2 of Fig. 1.

In the drawing 10 indicates an end plate of the mower, 11 one of the traction wheels and 12 the helical blades of the rotary cutter 13 journalled in the end plates and connected to the traction wheels by any suitable driving train.

Each end plate, is perforated at 14, parallel with the axis of cutter 13, to receive a bolt 15 which, with its aligned companion, forms a pivotal axis for the carrier 16 of the stationary blade 17. The active edge of blade 17 is spaced to one side of the axes of bolts 15 and at the other side of this axis and considerably more spaced therefrom, carrier 16 is provided with a cylindrical lug 18 conveniently integral with the carrier, as shown in Fig. 1.

Adjacent lug 18, end plate 10 is provided with a lug 19 having a finely threaded perforation 20 at right angles to the axis of cutter 13. Threaded in perforation 20 is an adjusting screw 21 which, at its lower end, is provided with a pair of axially spaced collars 22, 22. A lock nut 23, on the outer end of screw 21, when brought into engagement with the upper end of lug 19, serves to lock screw 21 in adjusted position.

The lug 18 and the adjacent faces of collars 22, 22 are accurately machined so that lug 18 may lie between the collars with a close running fit without appreciable play.

It will be noted that, with this construction, the active edge of the stationary blade may be accurately positioned either toward or from the cylinder of revolution of the edges of knives 12 by simultaneous equal turning of the screws 21, 21 in the proper direction. Because of the accurate fitting of lugs 18 between their associate collars 22, 22 the operator does not need to exert any great force on screws 21 to firmly position the stationary blade, and because the threads of screws 21 are relatively fine and lugs 18 are considerably more spaced from bolts 15 than is the active edge of blade 17 a relatively considerable turning of screws 21 is required to cause a relatively small movement of the active edge of blade 17 toward or from the path of movement of the active edges of blades 13. The upper ends of screws 21 are readily accessible so that they may be readily simultaneously turned equally. It is, of course, possible to attain desired and proper adjustments by successive small movements of the screws 21 alternately without unduly stressing the parts.

We claim as our invention:

1. In a lawn mower having a main body comprising connected side plates and a rotary cutter of the reel type journalled between said plates, a cutter-bar carrier pivoted between the side plates on an axis paralleling the axis of the rotary cutter, a straight cutter-bar on said carrier positionable to coact with the reel type cutter, a lug carried by a side plate offset relative to the axis of said carrier and having a threaded perforation at right angles to the carrier axis, an adjusting screw mounted in said perforation and having two axially-spaced rigid collars, and a rigid lug carried by said cutter-bar carrier and having opposed convex surfaces which engage and fit closely between said rigid collars.

2. A lawn mower structure of the character specified in the preceding claim, wherein the distance between the axis of the cutter-bar carrier and the contact between the carrier lug and the rigid collars of the adjustment screw is substantially greater than the distance between the axis of the cutter-bar carrier and the active edge of the straight cutter-bar.

GEORGE W. DAVIS.
WALTER C. DAVIS.